Oct. 28, 1969 A. ERTEL 3,475,700
MONOLITHIC MICROWAVE DUPLEXER SWITCH
Filed Dec. 30, 1966 4 Sheets-Sheet 1

INVENTOR:
ALFRED ERTEL
E. Mickey Hubbard
ATTORNEY

INVENTOR:
ALFRED ERTEL

E. Mickey Hubbard
ATTORNEY

United States Patent Office 3,475,700
Patented Oct. 28, 1969

3,475,700

MONOLITHIC MICROWAVE DUPLEXER SWITCH

Alfred Ertel, Dallas, Tex., assignor to Texas Instruments Incorporated, Dallas, Tex., a corporation of Delaware Filed Dec. 30, 1966, Ser. No. 606,201
Int. Cl. H01p *5/12*
U.S. Cl. 333—7 18 Claims

ABSTRACT OF THE DISCLOSURE

A duplexer switch consisting of two single-pole, single-throw diode switches formed in a monolithic semiconductor slice and interconnecting the branches of a T formed by microstrip transmission lines overlying the surface of the semiconductor chip. The opposite surface of the monolithic chip is covered by a ground plane which is D.C. isolated from the chip by an insulating layer. The diodes are D.C. biased through suitable decoupling elements such as chokes and capacitors formed on the surface of the semiconductor chip. Surface-oriented PIN gap diodes are used in the switch. The switch may be used to switch an antenna from a transmit path to a receive path, to switch from one phase shift network to another, or to switch from one local oscillator circuit to another, for example.

BACKGROUND OF THE INVENTION

The invention relates generally to microwave systems, and more particularly to a microwave duplexer switch fabricated on a monolithic high resistivity semiconductor substrate.

One of the more common uses of a duplexer switch at UHF and microwave frequencies is to switch a radar antenna between the transmit and receive path. When used in this manner, the duplexer switch is commonly referred to as a TR switch. In earlier radar systems, gas filled TR tubes were used for most microwave radar systems, particularly for X-band operation. Solid-state single-pole, single-throw microwave switches have been developed which may be used in pairs for TR switching at X-band. TR switches have also been developed in hybrid form wherein discrete semiconductor devices are mated with the remaining portion of the circuit formed on a ceramic or other insulating substrate. Each successive development has reduced the size of the TR switch and increased its reliability, while tending to reduce its cost. However, a monolithic switch suitable for use at microwave frequencies has not been achieved. All of the factors which make lower frequency monolithic integrated circuits highly desirable also apply to monolithic microwave structures. Monolithic devices may be fabricated in their intirety by batch processing techniques, which tends to increase the overall reproducibility and reliability of the devices. In addition, the use of a semiconductor substrate provides the best thermal transfer medium because the active semiconductor devices are actually a part of the substrate. Dimensions may be held to more exact values in monolithic devices because the same photographic masks control the position of the active devices and the remainder of the circuit. This is ideal for critical higher frequency circuits.

SUMMARY OF INVENTION CLAIMED

Briefly, the invention comprises a diode formed in a high resistivity substrate and connected within a microstrip transmission line formed on the surface of the substrate. Bias is applied to selectively forward bias the diode "on" through a system of quarter wavelength chokes and bypass capacitors. A ground plane is formed over the opposite face of the semiconductor substrate and is isolated from the substrate by a thin insulating layer. In accordance with a more specific aspect of the invention, a pair of diodes are located at the junction of a T formed by three microstrip transmission lines to provide two single-pole, single-throw switches in a configuration suitable for use as a TR switch. Several specific embodiments of the biasing networks are also claimed.

DESCRIPTION OF THE PREFERRED EMBODIMENTS

Figures 1, 2:
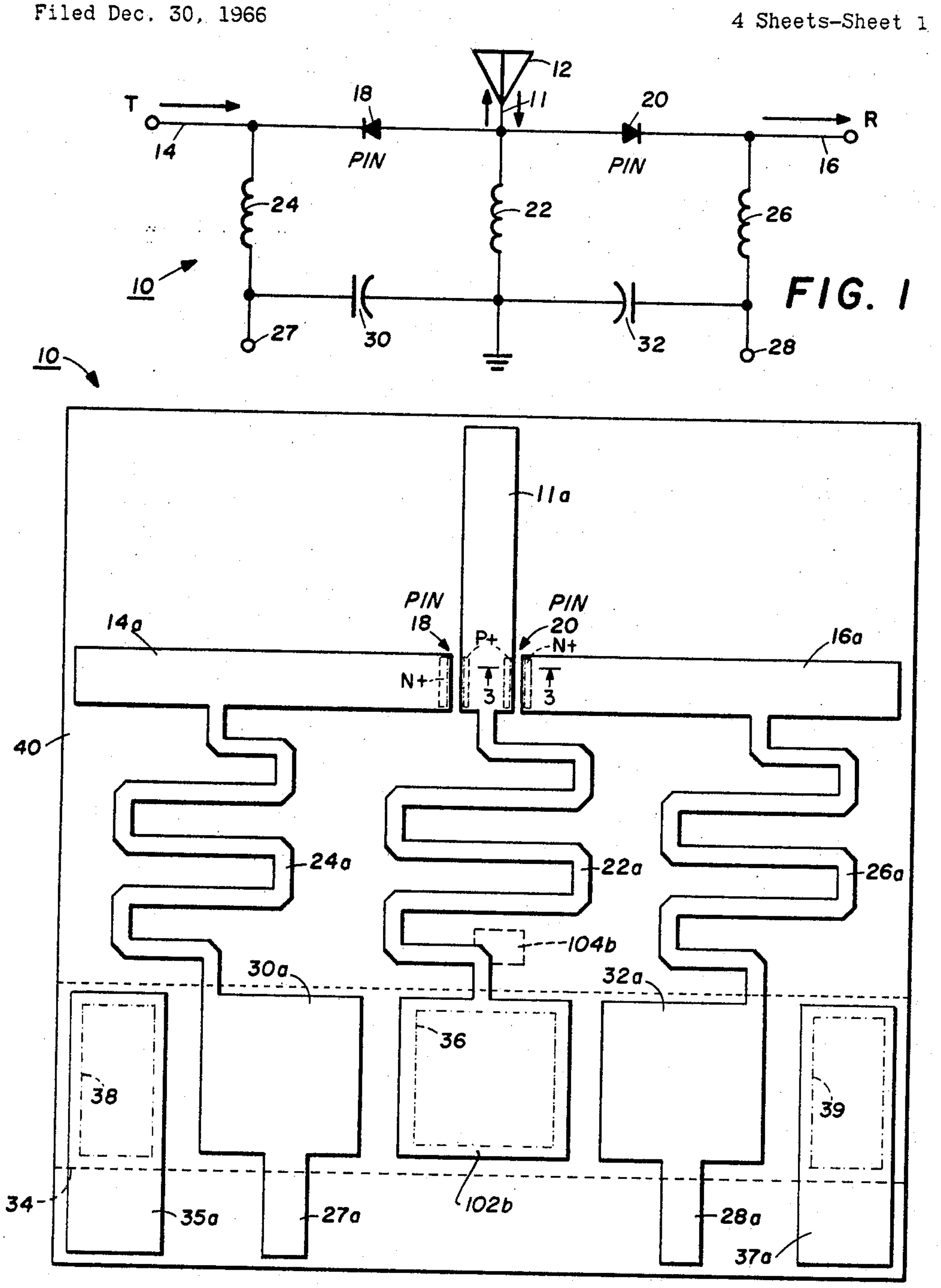
FIGURE 1 is a schematic circuit diagram of a preferred embodiment of the invention.
FIGURE 2 is a plan view of the embodiment of the invention represented in FIGURES 1 and 4 in monolithic form.

Referring now to the drawings, and in particular to FIGURE 1, a duplexer switch constructed in accordance with the present invention is indicated generally by the reference numeral 10. The duplexer switch is shown connected by a transmission line 11 to a radar antenna 12, and the antenna 12 is alternately connected to the transmit path 14 or to the receive path 16 by diodes 18 and 20, respectively. The transmit and receive paths 14 and 16 are both transmission lines.

It will be noted that diodes 18 and 20 are connected in opposed relationship. Diode 18 may be selectively forward biased through the circuit extending from ground through a first quarter wavelength choke 22, diode 18 and a second quarter wavelength choke 24 to a bias terminal 27. Similarly, diode 20 may be selectively forward biased through the circuit extending from ground through the first quarter wavelength choke 22, diode 20 and a third quarter wavelength 26 to another bias terminal 28. The bias terminals 27 and 28 are RF shorted to ground by bypass capacitors 30 and 32, respectively.

The entire circuit 10 is implemented in monolithic form in FIGURE 2 and is indicated generally by the same reference numeral. The circuit 10 is formed on a semiconductor substrate 40 having a very high resistivity. For example, a p-type silicon substrate having a resistivity greater than 1500 ohm-centimeters is preferred, although gallium arsenide or any other suitable high resistivity semiconductor material may be used. The diodes 18 and 20 are preferably surface-oriented PIN gap diodes formed by conventional diffusion techniques in the top surface of the substrate 40. Each of the diodes is formed by a heavily doped, very shallow diffused p-type region spaced from a heavily doped, very shallow diffused n-type region, substantially as shown in dotted outline in FIGURE 2. Thus, the heavily doped p-type and n-type regions are separated by a gap of high resistivity material which becomes intrinsic under reverse bias. The diffused regions then act like the parallel plates of a capacitor and are of very small area as a result of the shallow diffusions. A metallized strip 34 my be formed either directly on the surface of the substrate, or on the oxide layer resulting from the diffusion process used to form the diodes. Then an insulating layer, such as silicon dioxide, is formed over the metallized strip 34. Openings are then cut in the insulating layer over the two diffused regions of each of the diodes 18 and 20 and over the metal strip 34 as shown by the dotted outlines 36, 38, and 39. Then the entire surface of the substrate is coated with a metal film, either aluminum, or a gold system including a high eutectic temperature metal directly on the silicon, and patterned to leave the various components of the circuit 10 which are designated by the same reference characters followed by the letter "*a*." Thus, the input 14*a*, the output 16*a*, and the line 11*a* to the antenna 12 are all formed by microstrip lines. The quarter wavelength chokes 22*a*, 24*a*, and 26*a* are formed by meandering microstrip lines. Capacitors 30*a* and 32*a* are formed by the expanded areas shown in FIGURE 2 and the underlying metallized strip 34, which is grounded. Choke 22*a* is connected to the metallized strip 34 through the opening 36 cut in the insulating layer which acts as the dielectric between the strip 34 and the capacitor plates 30*a* and 32*a*. The bias terminals 27*a* and 28*a* extend from the capacitor plates 30*a* and 32*a* to points near the edge of the substrate. Pads 35*a* and 37*a* allow for external connection to metallized strip 34 through openings 38 and 39 cut in the insulating layer.

Figure 3:
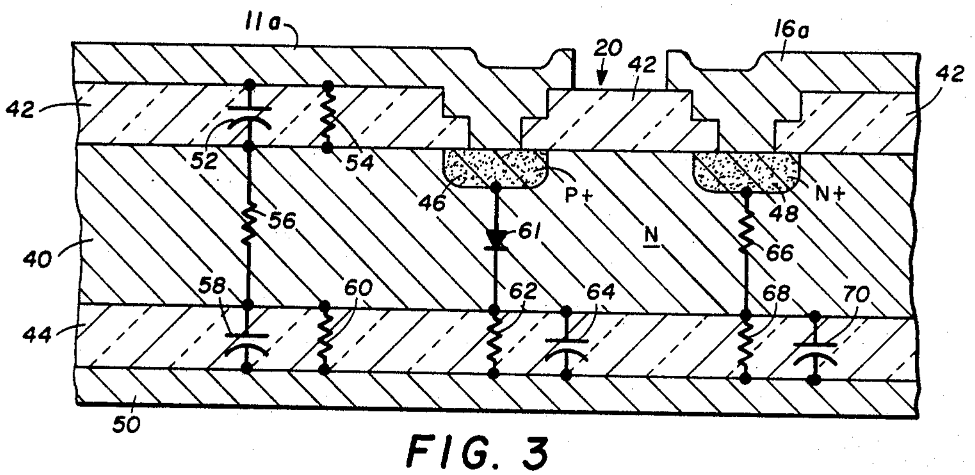
FIGURE 3 is a simplified sectional view taken generally on lines 3—3 of FIGURE 2 with equivalent circuit components indicated schematically.

As can be seen in the sectional view of FIGURE 3, the opposite side of the semiconductor substrate 40 is coated first with an insulating layer 44, such as silicon dioxide, and then with a metallized ground plane 50. The ground plane 50 is shorted to the metallized strip 34 (not shown) on the top surface of the substrate by external circuitry (also not shown). By selecting the proper width for the microstrip transmission lines 11*a*, 14*a* and 16*a* with relation to the thickness of the semiconductor substrate, microstrip lines having the desired characteristic impedance can be formed. The properties of microstrip transmission lines using semiconductor dielectrics are reported in "Microstrip Transmission on Semiconductor Dielectrics" by T. M. Hyltin, IEEE Transactions on Microwave Theory and Techniques, volume MTT–13, page 777, November 1965. The characteristic impedance of such a transmission line is determined by the ratio of the width of the microstrip transmission line to the thickness of the silicon dielectric, which is essentially the spacing between the microstrip line and the ground plane. To achieve a microstrip line of fifty ohms characteristic impedance, the ratio is 0.6. Thus, when using a ten mil thick silicon substrate, the microstrip transmission lines 11*a*, 14*a* and 16*a* should be six mils. The quarter wavelength chokes 22, 24 and 26 are two mils wide and have a characteristic impedance of seventy ohms. Using p-type silicon having a resistance of 1500 ohm-centimeters, the line loss for microwaves in the X-band is about 0.5 db/cm. As the resistivity of the silicon decreases, the energy loss increases rapidly.

The quarter wavelength decoupling chokes 22, 24 and 26 have been given a meander line shape in order to conserve space. The numerical value of the ratio of wavelength in free space to wavelength in the configuration shown at 9 gHz. is 2.78 for a ten mil thick high resistivity silicon substrate. However, it has been found that the calculated value of 118 mils for a quarter wavelength must be corrected to 136 mils to allow for mutual coupling between the turns of the meandering choke line.

The thin film bypass capacitors 30 and 32 are designed to provide an RF path to ground with less than one ohm impedance in the X-band. The dielectric may be silicon dioxide obtained by the thermal decomposition of silane an oxygen atmosphere. With an oxide thickness of approximately 4000 angstroms, a capacitance of 0.07 picofarad per square mil is obtained. The total area per capacitor is four hundred square mils, thus providing five-eighths of an ohm reactance at X-brand. The metal films may be either aluminum or molybdenum-gold.

As previously mentioned, the diodes 18 and 20 are preferably of the surface-oriented type wherein the anode and cathode areas are heavily doped diffused regions disposed in side-by-side, but spaced, relationship in the surface of the silicon substrate. Then the carrier flow under bias is approximately parallel to the surface. In accordance with an important aspect of the invention, the heavily doped p-type and n-type diffused regions extend transversely of the strip lines and are spaced part to provide a short high resistivity or intrinsic region between the diffused regions. The diffused regions preferably have high surface concentrations and are made very shallow so that the opposed areas of the diffused regions are very small. Further, the spacing between the diffused regions is selected such that under reverse bias the depletion layer extends completely across the high resistivity region so that the high resistivity region becomes devoid of carriers and therefore intrinsic. The capacitance of the diode then changes only negligibly with variations in voltage and is very small. Capacitances as low as 0.005 to 0.008 picofarad under reverse bias can easily be achieved, resulting in an isolation under reverse bias at 9 gHz. of from 31 db to 27 db for the respective capacitance values.

The minimum insertion loss is dependent on the transmission line properties of the semiconductor substrate. At RF and microwave frequencies, the substrate acts as a dielectric or a lossy dielectric, depending on the resistivity of the silicon. However, this situation can be altered drastically when direct current or low frequency current is present. Therefore, it is important to prevent any D.C. current from passing through the semiconductor substrate. Thus, in the sectional view of FIGURE 3 the high resistivity silicon substrate 40 is shown coated with silicon dioxide insulating layers 42 and 44. The strip lines 11*a* and 16*a* extend through the openings in the oxide layer 42 and contact the heavily doped p-type and n-type regions 46 and 48 of the diode 20, respectively. A metallized ground plane 50 is formed over the oxide layer 44.

Schematic circuit components have been superimposed upon the sectional view of FIGURE 3 to assist in understanding the importance of insulating layer 44. For example, the insulating layer 42 acts as the dielectric of a capacitance 52 and a resistance 54 in parallel, which are, of course, distributed along the microstrip transmission lines 11*a* and 16*a*. The silicon substrate 40 acts as a resistor 56, and the insulating layer 44 acts as the dielectric of a capacitance 58 and resistance 60 in parallel. The diffused region 46 of the diode 20 in conjunction with the lightly doped n-type substrate 40, for example, acts as a diode 61 in the circuit including the resistance 62 and the capacitance 64 of the insulating layer 44. The silicon substrate acts as a resistance 66 between the n+ region and the oxide layer 44 and this circuit is completed to the ground plane 50 by resistance 68 and capacitance 70 in parallel. The lightly doped region may also be p-type. In that case, the diode 61 in reversed polarity would be interchanged with resistance 66.

In operating a microwave monolithic integrated circuit, the active components formed in the substrate, such as the diodes 18 and 20, have various potentials on their electrodes or terminals which may cause the flow of direct current between one or more of these electrodes and the ground plane. If the contact between the metal microstrip line and the silicon is ohmic, and no junction barrier exists, then current may flow with equal ease in either direction through the ohmic contact, depending upon the polarity of the applied bias. The magnitude of the current flow is entirely dependent upon the resistance of both the metallic and semiconductor layers. If a potential barrier is present either in the silicon, or at the interface of the metal and silicon, then current flow is enhanced in one direction of applied bias, and suppressed in the other direction. Such a condition is represented by the diode 61. When uncombined carriers are present in the silicon 40 as a result of potential which exists across it, the carriers have the effect of lowering the apparent resistance of the silicon, a phenomenon known as conductivity modulation. The dielectric properties of the semiconductor are then degraded by this current flow. When a potential barrier exists between a semiconductor electrode and the high resistivity substrate material, the unidirectional enhanced D.C. flow may be inhibited by reverse biasing the semiconductor junction with respect to ground. However, D.C. leakage currents through ohmic contacts may not be stopped by these means. Direct current flow through high resistivity semiconductor substrate is, however, eliminated completely by providing the insulating layer 44 between the ground plane 50 and the semiconductor substrate 40. The presence of the insulating layer 44 does not affect the UHF or microwave transmission properties of the microstrip transmission lines, but will effectively open circuit any D.C. path to the ground plane 50, thus preventing a loss of dielectric properties of the high resistivity substrate 40 by preventing conductivity modulation of the silicon. Silicon dioxide, silicon nitride, or vapor deposited silicon carbide, for example, all have been used for the insulating layer 44 with equal success.

Figure 4:
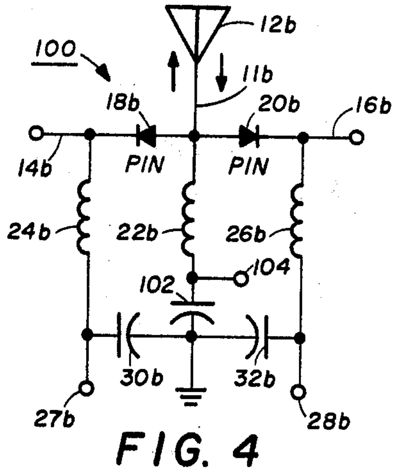
FIGURES 4–7 are schematic circuit diagrams illustrating other embodiments of the invention.

Referring now to FIGURE 4, another duplexer switch in accordance with this invention is indicated generally by the reference numeral 100. The duplexer switch 100 is substantially identical to the duplexer switch 10 and corresponding components are therefore designated by the same reference numerals followed by the character "*b*." However, the quarter wavelength choke **22*a* is coupled to ground by a bypass capacitor 102 to provide an RF short to ground, but D.C. and low frequency isolation. An additional biasing terminal 104 is connected to the choke 22*b* so that the biasing level used to switch diodes 18*b* and 20*b* may be other than ground. Thus, while only negative voltages can be used on terminals 27*b* and 28*b* to selectively switch diodes 18*b* and 20*b* "on," the additional input biasing terminal 104 permits the use of any desired voltage levels to operate the switching circuit 100**.

In monolithic form, the circuit of FIGURE 4 is substantially identical to the monolithic circuit of FIGURE 2 except as to the following aspects:

(1) Eliminate the opening 36 to form the capacitor plate **102*b* and to provide a capacitor 102 between the end of the quarter wavelength choke 22*a* and the metallized strip 34**, which is grounded.

(2) Add bias plate **104*b* between the capacitor plate 102*b* and the quarter wavelength choke 22*a*** (note dashed lines in FIG. 2).

Figure 5:
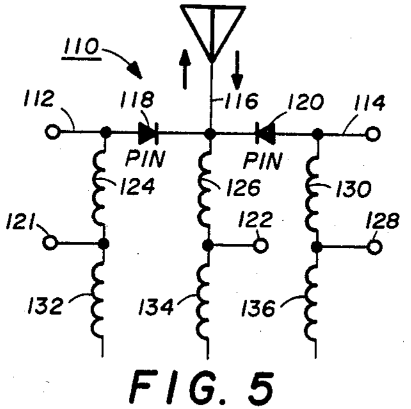
Figure 8:
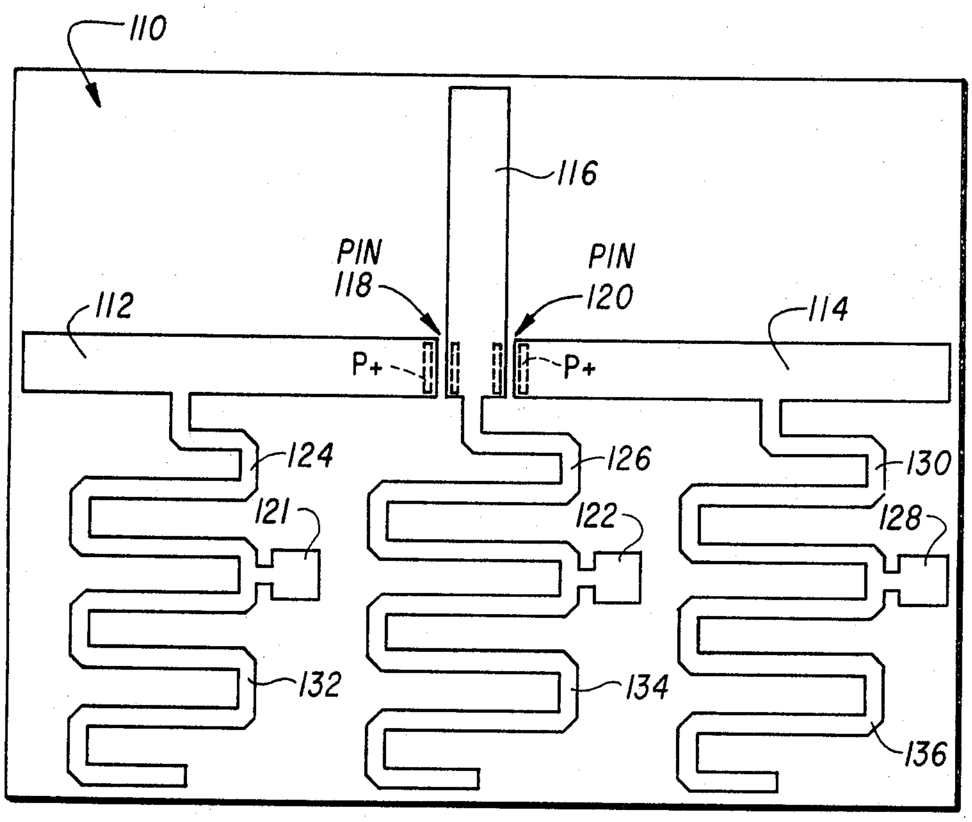
FIGURES 8–10 are, respectively, plan views of the embodiments of the invention represented in FIGURES 5–7 in monolithic form.

Another switching circuit in accordance with the present invention is indicated generally by the reference numeral 110 in FIGURES 5 and 8. The switching circuit 110, when used as a TR switch, for example, has microstrip lines 112 and 114 for the transmit and receive paths, respectively, which are connected to the antenna leg 116 by diodes 118 and 120, respectively. It will be noted that the diodes 118 and 120 are connected in opposed relationship, but are reversed when compared to diodes 18 and 20 on the switch 10. The orientation of the diodes is immaterial because when forward biased, the diodes conduct RF signals equally in either direction. Diode 118 can be selectively forward biased by making terminal 121 positive with respect to terminal 122. Current then flows through the quarter wavelength choke 124, diode 118, and quarter wavelength choke 126. Similarly, diode 120 may be selectively forward biased by making terminal 128 positive with respect to terminal 122 so that current flows through the quarter wavelength choke 130, diode 120, and the quarter wavelength choke 126.

Open end quarter wavelength chokes 132, 134 and 136 are connected to terminals 121, 122 and 128, respectively. The open ended quarter wavelength choke 132 reflects an RF short to D.C. terminal 121, and quarter wavelength choke 124 reflects this short as an open circuit at the junction of the choke 124 with the microstrip line 112. Similarly, the open ended quarter wavelength choke 134 reflects an RF short to the terminal 122, and the quarter wavelength choke 126 reflects this short as an open circuit at the junction of the microstrip lines 112, 114 and 116. In the same manner, quarter wavelength open ended choke 136 reflects a short to terminal 128, and this short is reflected as an open circuit at the microstrip line 114 by the quarter wavelength choke 130.

Thus, it will be noted that either of the diodes 118 or 120 may be selectively forward biased to connect the respective microstrip line 112 or 114 to the antenna microstrip line 116, and that the biasing network including the chokes 124, 126, 130, 132, 134 and 136 all reflect RF open circuits at these microstrip lines so as not to interfere with their RF transmission properties. The switch 110 can be fabricated in the same manner as the switch 10, substituting the quarter wavelength chokes 132, 134 and 136 for the capacitors. This circuit has the advantage of eliminating the three layer capacitor structure, but has the disadvantage of requiring more space for the three additional chokes.

Figure 6:
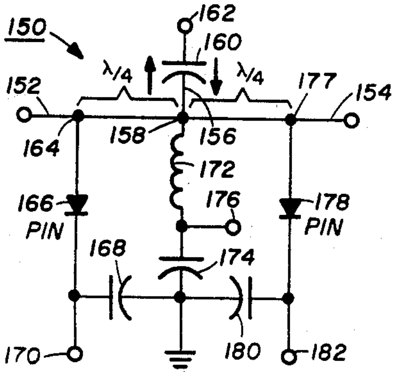
Figures 9, 10:
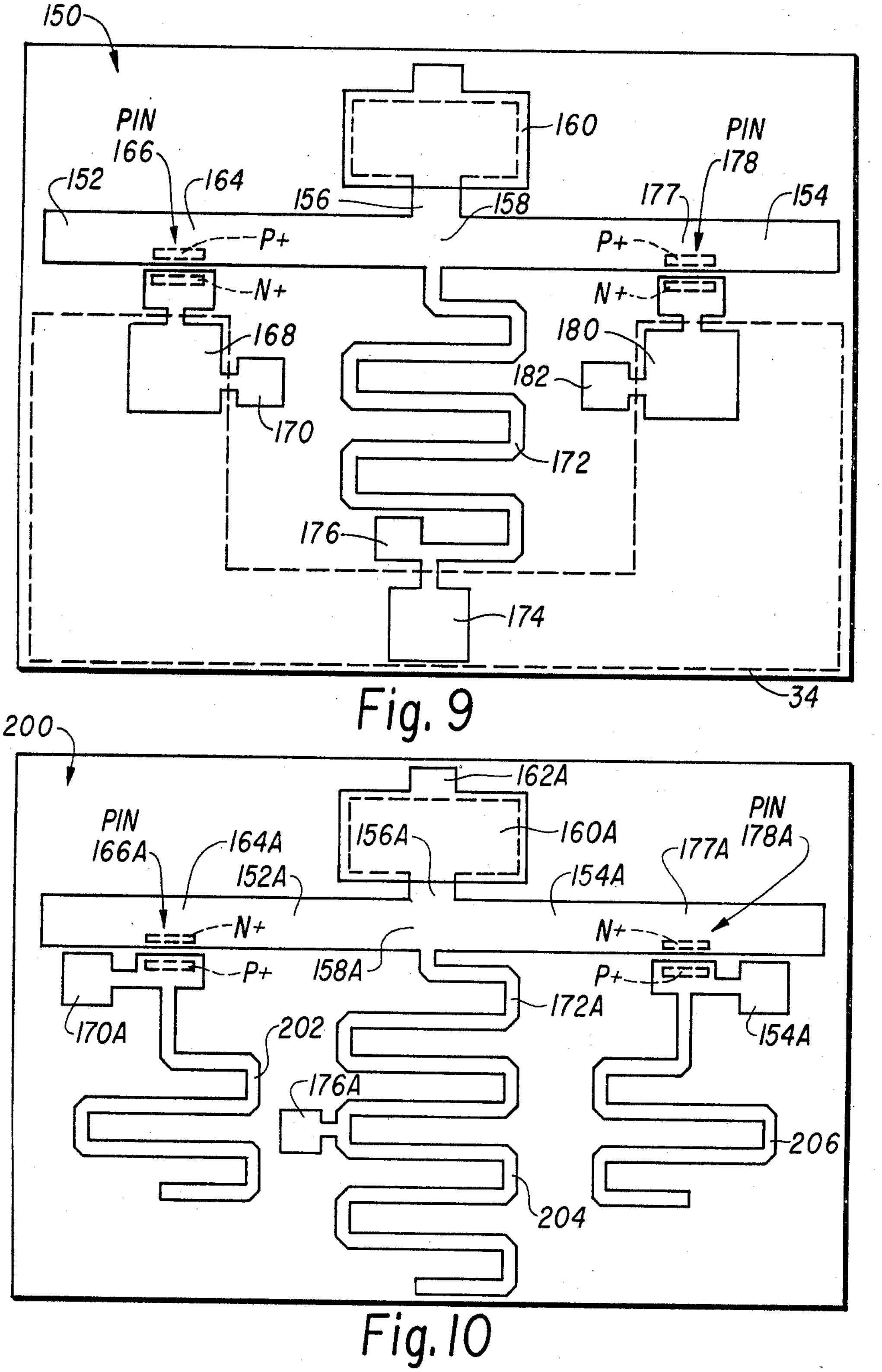

Another duplexer switch in accordance with the present invention is indicated generally by the reference numeral 150 in FIGURES 6 and 9. The duplexer switch 150 is comprised of three microstrip lines 152, 154 and 156 connected at a common junction 158 to form a "T." Microstrip lines 152 and 154 may be connected directly to transmission lines extending to other circuitry, but transmission line 156 includes a capacitor 160 which provides an RF short but D.C. isolates the output terminal 162. The junction 164 on the microstrip transmission line 152 is one quarter wavelength from the junction 158 and is coupled by a diode 166 and a bypass capacitor 168 to ground. A bias terminal 170 is connected to the junction between the diode 166 and the capacitor 168. The junction 158 is connected by a quarter wavelength choke 172 and a capacitor 174 to ground, and a bias terminal 176 is connected to the junction between the choke 172 and capacitor 174. The junction 177 which is located one quarter wavelength from the junction 158 on the microstrip transmission line 154 is connected by a diode 178 and a capacitor 180 to ground, and a third bias terminal 182 is connected to the junction between the diode 178 and the capacitor 180.

It will be noted that diode 166 can be selectively forward biased by making terminal 176 more positive than terminal 170 so that current will pass through quarter wavelength choke 172, the quarter wavelength section of microstrip transmission line 152 and the diode 166. Similarly, diode 178 can be selectively forward biased by making terminal 176 more positive than terminal 182 so that current will flow from terminal 176 through quarter wavelength choke 172, the quarter wavelength of microstrip transmission line 154 between junction 158 and junction 177, and diode 178, to terminal 182.

Assuming that diode 166 is forward biased "on" and diode 178 is reverse biased "off," then diode 166 and capacitor 168 short RF energy at junction 164 to ground, thus isolating the D.C. or low frequency voltage supply connected to terminal 170 from the microwave energy. The quarter wavelength of the microstrip line 152 between junctions 146 and 158 reflects an open circuit at the junction 158. The microwave signal then will flow through the path between terminal 162 and microstrip line 154. The quarter wavelength choke 172 reflects the short produced by capacitor 174 as an open circuit at junction 158, and diode 178 is reverse biased "off," thus providing an open circuit at point 177.

When diode 166 is reverse biased "off" and diode 178 is forward biased "on," the conditions are reversed and the microwave energy will pass through the path between terminal 162 and microstrip transmission line 152. The short circuit provided by capacitor 180 and diode 178 is reflected by the quarter wavelength of transmission line 154 between junctions 177 and 158 as an open circuit at junction 158, quarter wavelength choke 172 reflects the short provided by capacitor 174 as an open circuit at junction 158, and diode 166 is "off" and presents an open circuit at junction 164.

Figure 7:
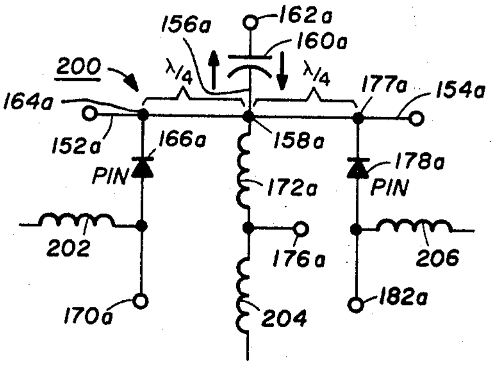

Another embodiment of the present invention is indicated generally by the reference numeral 200 in FIGURES 7 and 10. The switch 200 is similar to the switch 150 and the corresponding components are, therefore, designated by the same reference numerals followed by the reference character "*a*." The circuit 200 differs from the circuit 150 in that open ended quarter wavelength chokes 202, 204 and 206 have been substituted for capacitors 168, 174 and 180. The electronic function of the open ended quarter wavelength chokes 202, 204 and 206 is identical to that of the capacitors 168, 174 and 180 in that the open ended chokes reflect microwave shorts to the terminals 170*a*, 176*a* and 182*a*. The operation of the circuit 200 is otherwise identical to the operation of the circuit 150.

Each of the circuits 100, 110, 150 and 200 may be fabricated in substantially the same manner as the circuit 10. In addition, various combinations of the five circuits shown may be used as desired. Although preferred embodiments of the invention have been described in detail, it is to be understood that various changes, substitutions and alterations can be made therein without departing from the spirit and scope of the invention.

What is claimed is:

1. A monolithic microwave switch comprising in combination:

(a) a high resistivity semiconductor substrate having at least two major surfaces;
(b) a layer of insulating material overlying a substantial portion of one of said major surfaces of said substrate;
(c) a metalized ground plane overlying a substantial portion of said insulating layer so as to be D.C. isolated from said substrate;
(d) a PIN diode formed in the other of said major surfaces of said substrate, said diode having two spaced regions terminating at said other surface with one region being of one conductivity and the other region being of opposite conductivity;
(e) a first microstrip line extending over said other surface and being in ohmic contact with said one region of said diode;
(f) a second microstrip line extending over said other surface and being in ohmic contact with said other region of said diode, said second line being connected to said first line through said diode; and
(g) a D.C. biasing circuit connected across said diode for selectively forward biasing said diode, said biasing circuit includes microwave isolation means and is formed by microstrip lines on said other surface of said substrate; and wherein
(h) said first and second microstrip lines and said PIN diode form an L-shaped path for microwave energy; and wherein
(i) said diode is D.C. connected to the junction of said microstrip L.

2. The monolithic microwave switch of claim 1 wherein said PIN diode is located in the principal path of the microwave energy.

3. The monolithic microwave switch of claim 2 wherein said D.C. biasing circuit includes:

(a) a quarter wavelength choke for each of said microstrip lines, said chokes being formed by microstrip lines on said other surface of said substrate with one end of each of said chokes being respectively connected to said microstrip lines and their other ends being respectively connectable to a bias potential; and
(b) a microwave by-pass capacitor for coupling each of the other ends of said chokes to ground, said by-pass capacitors being formed on said other surface of said substrate by a pair of metal films separated by an insulating layer.

4. The monolithic microwave switch of claim 2 wherein said D.C. biasing circuit includes:

(a) a quarter wavelength choke for each of said microstrip lines, said chokes being formed by microstrip lines on said other surface of said substrate with one end of each being respectively connected to said microstrip lines and their other ends being respectively connectable to a bias potential; and
(b) an open-ended quarter wavelength choke for each of said first mentioned chokes, said open-ended chokes being formed by microstrip lines on said other surface of said substrate with one end of each being respectively connected to said first mentioned chokes and their other ends being electrically open.

5. The monolithic microwave switch of claim 1 wherein said PIN diode is located in a microwave path that is in shunt with the principal path of the microwave energy.

6. The monolithic microwave switch of claim 5 wherein:

(a) said PIN diode is located one quarter wavelength from said junction of said microstrip L; and wherein
(b) said second microstrip line is respectively coupled to ground by a microwave by-pass capacitor, said capacitor being formed on said other surface of said substrate by a pair of metal films separated by an insulating layer; and wherein
(c) said second microstrip line is connectable to a bias potential.

7. The monolithic microwave switch of claim 6 wherein:

(a) said junction of said microstrip L is connectable to a bias potential by a quarter wavelength choke formed by microstrip lines on said other surface of said substrate; and wherein
(b) said choke is coupled to ground by a microwave by-pass capacitor formed on said other surface of said substrate by a pair of metal films separated by an insulating layer.

8. The monolithic microwave switch of claim 5 wherein:

(a) said PIN diode is located one quarter wavelength from the junction of said microstrip L; and wherein
(b) said second microstrip line is connected to an open-ended quarter wavelength choke formed by microstrip lines on said other surface of said substrate; and wherein
(c) said second microstrip line is connectable to a bias potential.

9. The monolithic microwave switch of claim 8 wherein:

(a) said junction of said microstrip L is connectable to a bias potential by a quarter wavelength choke formed by microstrip lines on said other surface of said substrate; and wherein
(b) said first mentioned choke is connected to an open-ended quarter wavelength choke formed by microstrip lines on said other surface of said substrate, said open-ended choke having its other end electrically open.

10. A monolithic microwave switch comprising in combination:

(a) a high resistivity semiconductor substrate having at least two major surfaces;
(b) a layer of insulating material overlying a substantial portion of one of said major surfaces of said substrate;
(c) a metallized ground plane overlying a substantial portion of said insulating layer so as to be D.C. isolated from said substrate;
(d) a pair of PIN diodes formed in the other of said major surfaces of said substrate, each of said diodes having two spaced regions terminating at said other surface with one region being of one conductivity and the other region being of opposite conductivity;
(e) a first microstrip line extending over said other surface and being in ohmic contact with said one region of both of said diodes;
(f) second and third microstrip lines each extending over said other surface and being respectively in ohmic contact with said other regions of said diodes;

said second and third lines being respectively coupled to said first line through said diodes; and (g) a D.C. biasing circuit connected across said diodes for selectively forward biasing said diodes, said biasing circuit includes microwave isolation means which are formed by microstrip lines on said other surface of said substrate; and wherein (h) said first, second, and third microstrip lines and said PIN diodes form a T-shaped path for microwave energy; and wherein (i) said diodes are each D.C. connected to the junction of said microstrip T.

11. The monolithic microwave switch of claim 10 wherein said PIN diodes are each located in the principal path of the microwave energy.

12. The monolithic microwave switch of claim 11 wherein said D.C. biasing circuit includes:

(a) a quarter wavelength choke for each of said microstrip lines, said chokes being formed by microstrip lines on said other surface of said substrate with one end of each of said chokes being respectively connected to said microstrip lines and their other ends being respectively connectable to a bias potential; and (b) a microwave by-pass capacitor for coupling each of the other ends of said chokes to ground, said by-pass capacitors being formed on said other surface of said substrate by a pair of metal films separated by an insulating layer.

13. The monolithic microwave switch of claim 11 wherein said D.C. biasing circuit includes:

(a) a quarter wavelength choke for each of said microstrip lines, said chokes being formed by microstrip lines on said other surface of said substrate with one end of each being respectively connected to said microstrip lines and their other ends being respectively connectable to a bias potential; and (b) an open-ended quarter wavelength choke for each of said first mentioned chokes, said open-ended chokes being formed by microstrip lines on said other surface of said substrate with one end of each being respectively connected to said first mentioned chokes and their other ends being electrically open.

14. The monolithic microwave switch of claim 10 wherein said PIN diodes are each located in a microwave path that is in shunt with the principal path of the microwave energy.

15. The monolithic microwave switch of claim 14 wherein:

(a) said PIN diodes are each located one quarter wavelength from said junction of said microstrip T; and wherein (b) said second and third microstrip lines are respectively coupled to ground by a microwave by-pass capacitor, each of said capacitors being formed on said other surface of said substrate by a pair of metal films separated by an insulating layer; and wherein (c) said second and third microstrip lines are connectable to a bias potential.

16. The monolithic microwave switch of claim 15 wherein:

(a) said junction of said microstrip T is connectable to a bias potential by a quarter wavelength choke formed by microstrip lines on said other surface of said substrate; and wherein (b) said choke is coupled to ground by a microwave by-pass capacitor formed on said other surface of said substrate by a pair of metal films separated by an insulating layer.

17. The monolithic microwave switch of claim 14 wherein:

(a) each of said PIN diodes are located one quarter wavelength from the junction of said microstrip T; and wherein (b) said second and third microstrip lines are connected to an open-ended quarter wavelength choke formed by microstrip lines on said other surface of said substrate; and wherein (c) said second and third microstrip lines are connectable to a bias potential.

18. The monolithic microwave switch of claim 17 wherein:

(a) said junction of said microstrip T is connectable to a bias potential by a quarter wavelength choke formed by microstrip lines on said other surface of said substrate; and wherein (b) said first mentioned choke is connected to an open-ended quarter wavelength choke formed by microstrip lines on said other surface of said substrate, said open-ended choke having its other end electrically open.

References Cited

UNITED STATES PATENTS

| | | | |
|---|---|---|---|
| 3,008,089 | 11/1961 | Uhlir | |
| 3,183,373 | 5/1965 | Sakurai. | |
| 3,321,717 | 5/1967 | Harper | 333—7 |
| 3,374,404 | 3/1968 | Luecke. | |

OTHER REFERENCES

Garver, R. V., Theory of TEM Diode Switching, IRE Trans. on MTT, May 1961, p. 232 relied on.

Uhlir, Jr., A., Microwave Applications of Integrated-Circuit Techniques, Proc. of the IEEE, December 1964. p. 1621 relied on.

HERMAN K. SAALBACH, Primary Examiner

P. L. GENSLER, Assistant Examiner

U.S. Cl. X.R.

307—244, 259; 317—235; 333—84